(12) United States Patent
Thrush

(10) Patent No.: US 8,800,212 B2
(45) Date of Patent: Aug. 12, 2014

(54) WALL MOUNTING DEVICES

(71) Applicant: Parallax Group International, LLC, San Juan Capistrano, CA (US)

(72) Inventor: Bruce A. Thrush, San Juan Capistrano, CA (US)

(73) Assignee: Parallax Group International, LLC, San Juan Capistrano, CA (US)

( * ) Notice: Subject to any disclaimer, the term of this patent is extended or adjusted under 35 U.S.C. 154(b) by 0 days.

(21) Appl. No.: 13/683,835

(22) Filed: Nov. 21, 2012

(65) Prior Publication Data

US 2013/0125495 A1 May 23, 2013

Related U.S. Application Data

(60) Provisional application No. 61/563,424, filed on Nov. 23, 2011.

(51) Int. Cl.
| | | |
|---|---|---|
| E04B 2/74 | (2006.01) | |
| A47F 5/08 | (2006.01) | |
| F16B 5/00 | (2006.01) | |
| F16B 45/00 | (2006.01) | |

(52) U.S. Cl.
CPC .............. *A47F 5/0846* (2013.01); *F16B 45/00* (2013.01)
USPC .................... 52/36.5; 211/94.01; 248/222.51; 248/304

(58) Field of Classification Search
USPC ............. 52/36.5, 518, 712; 211/94.01, 94.02, 211/87.01, 106, 45, 50; 24/457, 327, 489, 24/498; 248/690, 691, 304, 303, 306, 308, 248/339, 220.51; 312/408; 108/106, 107, 108/108
See application file for complete search history.

(56) References Cited

U.S. PATENT DOCUMENTS

| | | | |
|---|---|---|---|
| 2,898,640 | A | 8/1959 | Dail |
| 3,045,961 | A | 7/1962 | Cygan |
| 3,139,205 | A | 6/1964 | Haubrich |
| 3,409,260 | A | 11/1968 | Bleed |
| 3,486,634 | A | 12/1969 | Frater |
| 3,698,565 | A | 10/1972 | Weber |
| 3,804,067 | A | 4/1974 | Lehe |

(Continued)

FOREIGN PATENT DOCUMENTS

| | | |
|---|---|---|
| AU | 2008200650 | 2/2008 |
| CA | 2702184 A1 | 4/2009 |

(Continued)

OTHER PUBLICATIONS http://www.garageappeal.com/gladiatorgeartrack4channels2-pack.aspx. Mar. 7, 2013.

*Primary Examiner* — William Gilbert
*Assistant Examiner* — Kyle Walraed-Sullivan
(74) *Attorney, Agent, or Firm* — Fish & Tsang LLP

(57) ABSTRACT

Wall mounting assemblies and methods are disclosed. The assembly includes a bracket that has two frame members coupled at a hinge. Each frame member has a hook for engaging a recess or slot on a panel. The assembly further includes a panel that has edges that are configured to engage the edges of adjacent panels, without the need for tilting the panel to engage. Each panel has two slots for receiving the bracket. Bending the two frame members on the bracket causes the bracket's hooks to lock into the slots on the panel.

7 Claims, 6 Drawing Sheets

(56) References Cited

U.S. PATENT DOCUMENTS

| | | | |
|---|---|---|---|
| RE28,834 E | 6/1976 | Johnson | |
| 4,015,713 A | 4/1977 | Clipson | |
| 4,308,961 A * | 1/1982 | Kunce | 211/94.01 |
| 4,512,481 A * | 4/1985 | Thalenfeld | 211/57.1 |
| 4,603,068 A | 7/1986 | Hunter | |
| 4,618,192 A | 10/1986 | Kelley | |
| 4,694,965 A | 9/1987 | Parnell | |
| 4,805,784 A | 2/1989 | Solheim | |
| 4,809,479 A | 3/1989 | Tierno | |
| 4,817,900 A | 4/1989 | Whittington | |
| D301,424 S | 6/1989 | Beirise | |
| D310,103 S | 8/1990 | Beirise | |
| 5,170,605 A | 12/1992 | Huddle | |
| 5,224,610 A | 7/1993 | Veazy | |
| 5,228,579 A | 7/1993 | Kaufman | |
| 5,293,728 A | 3/1994 | Christopher | |
| 5,379,976 A | 1/1995 | DeGirolamo | |
| 5,409,120 A | 4/1995 | Miller | |
| 5,647,184 A | 7/1997 | Davis | |
| 5,775,521 A | 7/1998 | Tisbo | |
| D399,010 S | 9/1998 | Current | |
| 5,799,803 A | 9/1998 | Muller | |
| D414,567 S | 9/1999 | Burt | |
| 6,006,486 A | 12/1999 | Moriau | |
| 6,119,878 A * | 9/2000 | Zen | 211/94.01 |
| 6,123,154 A | 9/2000 | MacDonald, III | |
| 6,325,223 B1 | 12/2001 | Hannen | |
| 6,612,527 B1 | 9/2003 | Nagel | |
| 6,763,957 B1 | 7/2004 | Mullerleile | |
| 6,811,043 B2 | 11/2004 | Perkins | |
| 6,892,498 B1 | 5/2005 | Roman | |
| 6,964,085 B2 * | 11/2005 | Boda | 24/513 |
| 7,089,708 B1 | 8/2006 | Bostock | |
| 7,104,023 B1 | 9/2006 | Holtztrager | |
| 7,185,469 B2 | 3/2007 | Schaffeld | |
| 7,228,977 B2 | 6/2007 | Perkins | |
| D551,781 S | 9/2007 | Abdullah | |
| 7,527,156 B2 | 5/2009 | Wisnoski | |
| 7,686,172 B2 | 3/2010 | Wisnoski | |
| 7,694,925 B2 * | 4/2010 | Kokenge et al. | 248/220.42 |
| 7,717,279 B2 | 5/2010 | Lawson | |
| D617,583 S | 6/2010 | Daino | |
| 7,900,781 B2 * | 3/2011 | Baine et al. | 211/59.1 |
| 7,913,730 B2 | 3/2011 | Schaffeld | |
| 7,954,651 B2 * | 6/2011 | Kao | 211/70.6 |
| 8,033,404 B2 | 10/2011 | Keller | |
| 8,056,739 B2 | 11/2011 | Hopkins | |
| 8,113,476 B2 | 2/2012 | Serio | |
| 8,146,754 B2 | 4/2012 | Apgood | |
| 8,434,835 B2 | 5/2013 | Hardy | |
| 2005/0029210 A1 * | 2/2005 | Perkins et al. | 211/94.01 |
| 2006/0091094 A1 | 5/2006 | Schuberth | |
| 2007/0181517 A1 | 8/2007 | Perkins | |
| 2007/0221594 A1 | 9/2007 | Pierro | |
| 2008/0010938 A1 | 1/2008 | Hannig | |
| 2008/0105636 A1 * | 5/2008 | Lawson | 211/94.01 |
| 2008/0302744 A1 | 12/2008 | Rosenberg | |
| 2009/0134290 A1 | 5/2009 | Begic | |
| 2009/0145867 A1 * | 6/2009 | Apgood et al. | 211/94.01 |
| 2010/0122505 A1 | 5/2010 | Jakiel | |
| 2010/0213346 A1 * | 8/2010 | Chen | 248/693 |
| 2010/0269443 A1 | 10/2010 | Shen | |
| 2011/0042333 A1 * | 2/2011 | Magnusson et al. | 211/70.6 |
| 2011/0226715 A1 * | 9/2011 | Schwartzkopf et al. | 211/87.01 |
| 2011/0303798 A1 | 12/2011 | Bader | |

FOREIGN PATENT DOCUMENTS

| | | |
|---|---|---|
| CN | 201515932 | 6/2010 |
| WO | 2009048689 A1 | 4/2009 |
| WO | WO 2009100892 A1 * | 8/2009 |
| WO | 2011032772 A1 | 3/2011 |
| WO | 2011146794 A2 | 11/2011 |

* cited by examiner

US 8,800,212 B2

WALL MOUNTING DEVICES

This application claims benefit to U.S. Provisional Patent Application No. 61/563,424 filed on Nov. 23, 2011, which is incorporated herein by reference in its entirety.

FIELD OF THE INVENTION

The field of the invention is wall mounting devices.

BACKGROUND

The background description includes information that may be useful in understanding the present invention. It is not an admission that any of the information provided herein is prior art or relevant to the presently claimed invention, or that any publication specifically or implicitly referenced is prior art.

Various wall mounting devices for handing and storing items on a wall are known. US 2009/0134290 to Begic, for example, describes a slatwall mounting system that includes a wall mountable rail member (e.g., panel) and a bracket member. The rail member has slots for receiving the bracket member. The bracket member has a hook portion for hanging items thereon, and a cam for securely engaging a slot on the rail member.

As another example, US 2010/0122505 to Jakiel describes a slatwall system for mounting on a wall. The system comprises a plurality of wall panels that interlock with one another via tongue and groove attachments. The panels also have slots for engaging brackets.

Other examples of wall mounting devices are found in U.S. Pat. No. 4,805,784, U.S. Pat. No. 6,763,957, U.S. Pat. No. 6,811,043, AU2008200650, and CN201515932U.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

While wall mounting devices and methods are generally known, there remains a need to improve such devices and methods in order to optimize space utilization and reduce the number of installation steps. There also remains a need to simplify the installation process so that one person can easily perform the installation.

Thus, there is still a need for improved wall mounting devices and methods.

SUMMARY OF THE INVENTION

The inventive subject matter provides apparatus, systems, and methods in which a wall mounting assembly includes a plurality of brackets and a plurality of panels. Each bracket is made of two frame members coupled at a hinge. The frame members have a hook for engaging a recess or slot on a panel. The bracket also has an elongated member extending from the frames for hanging or fastening items to a wall.

Each panel has edges that are configured to engage the edges of adjacent panels, without the need for tilting the panel to engage. In one aspect of some embodiments, the slots near the edges of the panel are angled. Each panel also has two T-slots for receiving the hooks of the brackets. The brackets can lock onto the t-slots by rotating (e.g., bending) the two frame members on the bracket, which causes the hooks to lock into the slots on the panel.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide many advantageous technical effects including improved methods and devices for mounting components to walls.

Figure 1:
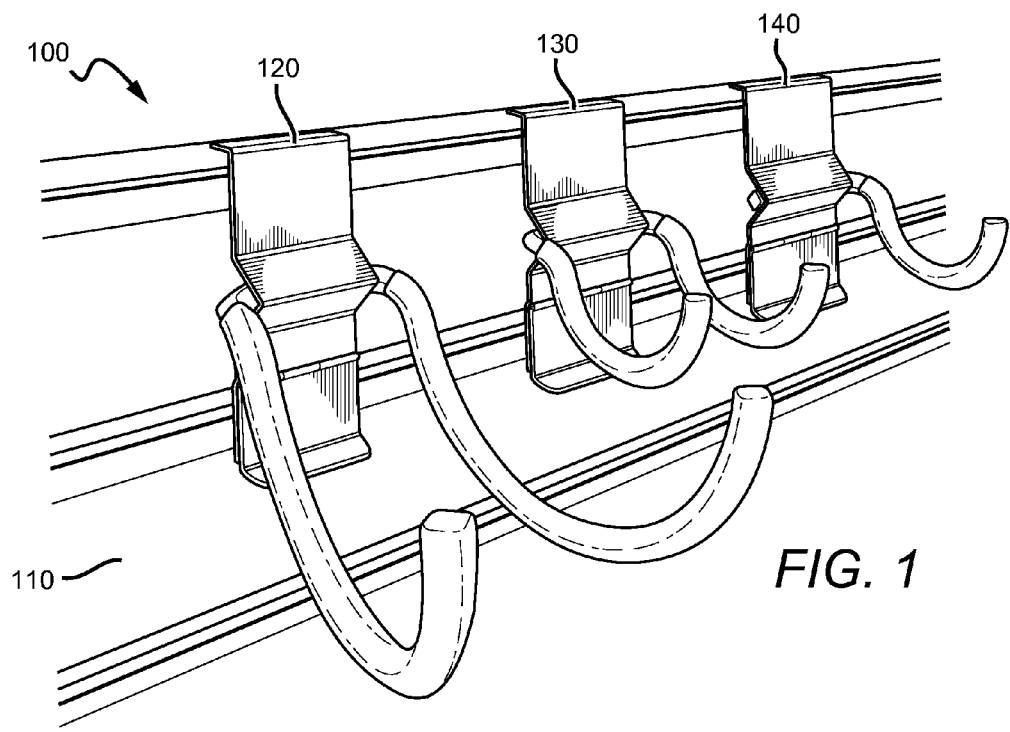
FIG. 1 is a perspective view of a wall mounting assembly.

FIG. 1 shows a perspective view of a wall mounting assembly 100. Assembly 100 includes a panel 110 and a plurality of brackets 120, 130, and 140. Brackets 120, 130, and 140 removably and repositionably engage slots on panel 110. Assembly 100 is useful for storing items on a wall.

Figure 2:
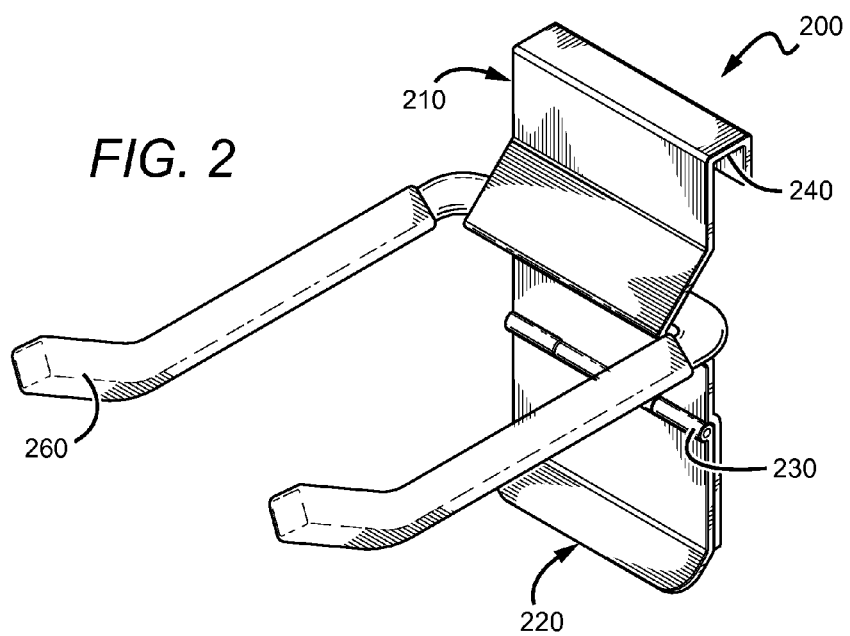
FIG. 2 is a perspective view of a bracket for a wall mounting assembly.

FIG. 2 shows a perspective view of a bracket 200. Bracket 200 has a first frame member 210 and a second frame member 220 that are rotatably coupled via hinge 230. First frame member 210 has an L-shaped hook 240 for engaging a recess or slot. Bracket 200 also has an elongated member 260 extending therefrom, for hanging an item.

Figure 3:
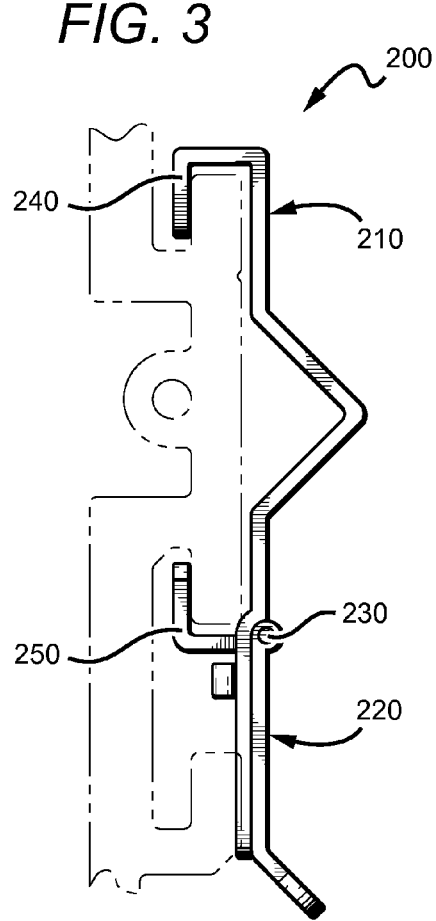
FIG. 3 is a side view of the bracket of FIG. 2 in a first (engaging) position.

FIG. 3 shows a side view of the bracket 200. This view reveals an L-shaped hook 250 on second frame member 220. FIG. 3 shows bracket 200 in a first position, also referred to as an engaging position. In the engaging position, hooks 240 and 250 are downward and upward facing, respectively, and can be used to grab two recesses (e.g., slots) on a wall or panel.

Figure 4:
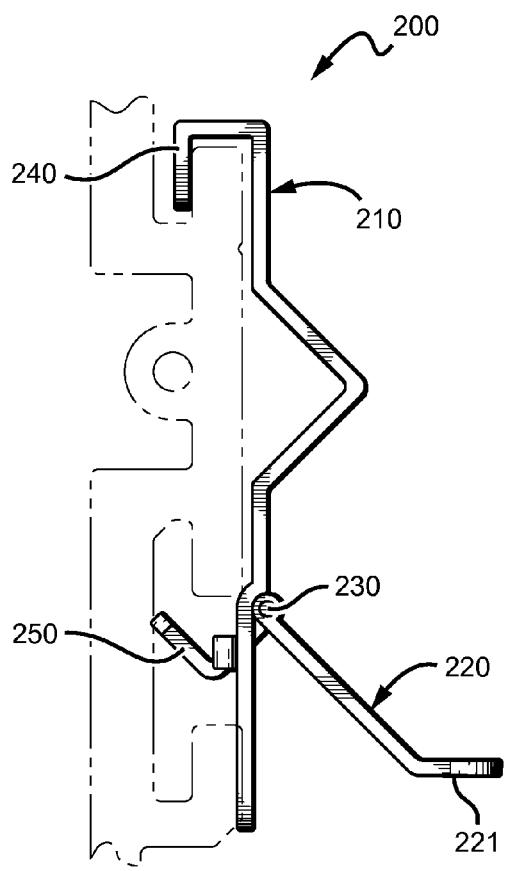
FIG. 4 is a side view of the bracket of FIG. 2 in a second (disengaging) position.

FIG. 4 shows a side view of bracket 200. FIG. 4 is similar to FIG. 3 except that second frame member 220 has been rotated with respect to first frame member 210, about hinge 230. FIG. 4 shows bracket 200 in a second position, also referred to as a disengaging position. In the disengaging position, hook 250 is angled outward so that a recess can be disengaged. Second frame member 220 has an angled handle portion 221 that allows a user to grip and rotate second frame member 220.

Figure 5:
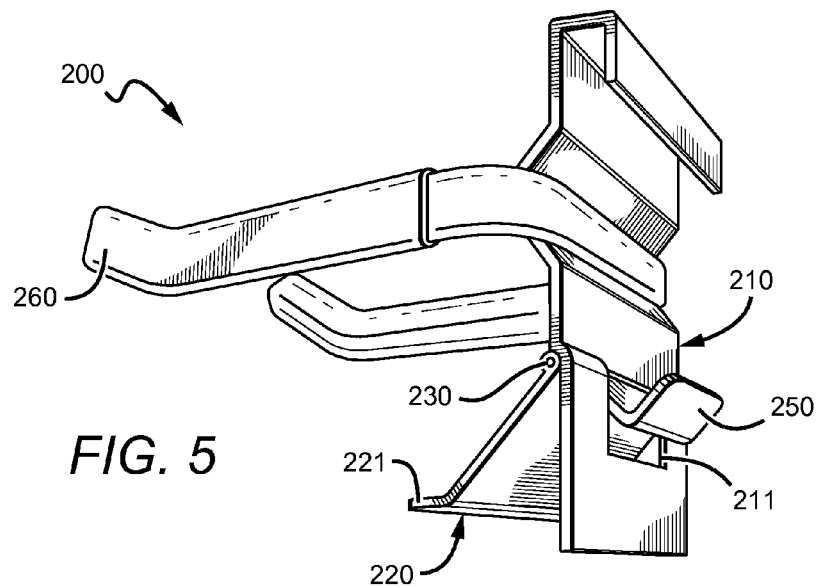
FIG. 5 is perspective view of the bracket of FIG. 2 in a second (disengaging) position.

FIG. 5 shows a perspective view of the back side of bracket 200 in the disengaging position. First frame member 210 has an opening 211 through which hook 250 is disposed.

Figure 6:
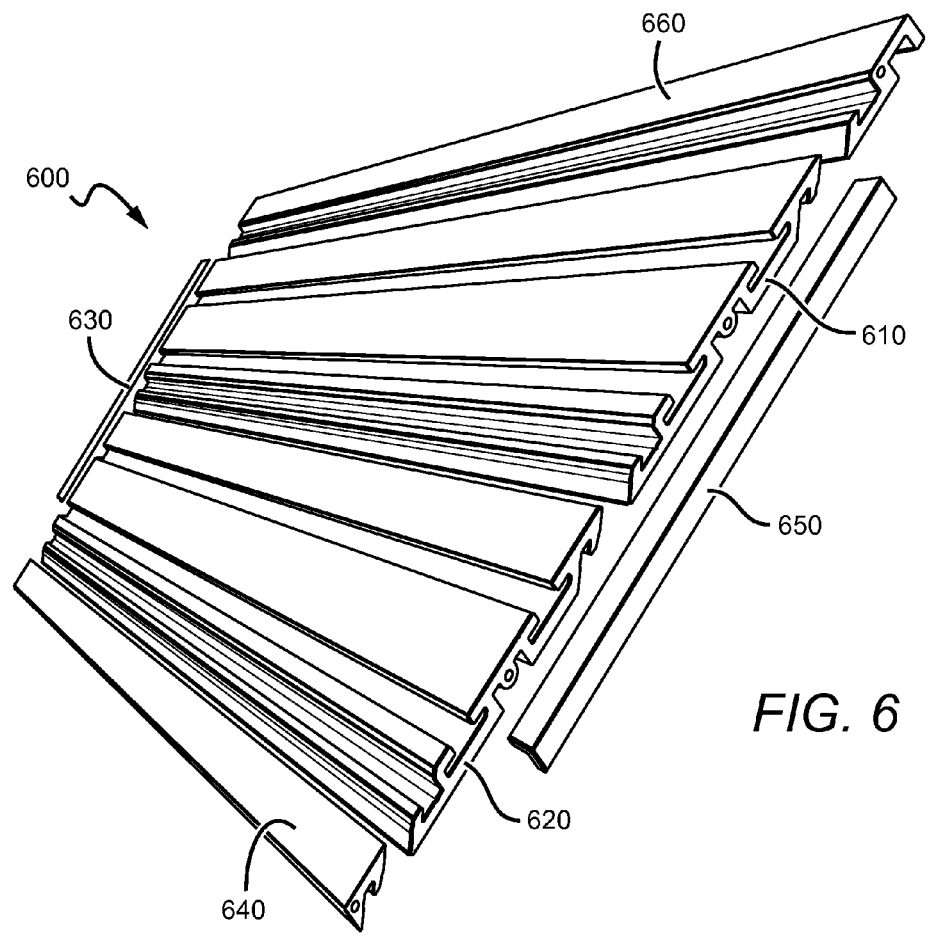
FIG. 6 is a perspective view of a plurality of panels for a wall mounting assembly.

FIG. 6 shows a perspective view of a plurality of disengaged panels 600 for a wall mounting assembly. Panel 610 and panel 620 engage one another to form a wall mountable panel for attaching brackets. Trim panels 630, 640, 650, and 660 provide a border around panels 610 and 620.

Figure 7A:
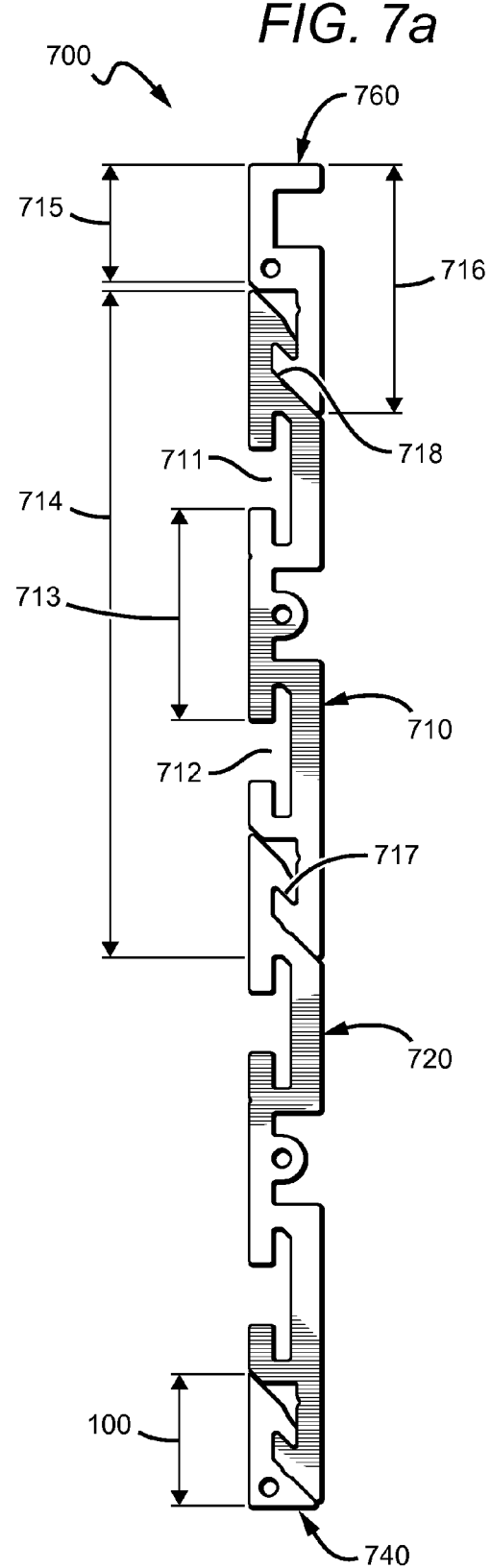
FIG. 7a is a side view of a plurality of panels for a wall mounting assembly.

FIG. 7a shows a side view of a plurality of panels 700 for a wall mounting assembly. Panels 700 include a first panel 710 engaged with a second panel 720. Panel 710 and panel 720 are substantially identical. Trim panels 740 and 760 engage panels 720 and 710 at their lower and upper edges, respectively.

First panel 710 has first major surface (i.e., a front surface) and a second major surface (i.e., a back surface). On the first major surface is a first t-shaped slot 711 and a second t-shaped slot 712 running parallel to one another along the length of panel 710. Slots 711 and 712 are separated by distance 713. Panel 710 has a height 714. The height of panel 710 is extended by a distance 715 when trim panel 760 is engaged with panel 710. Trim panel 760 has a height of 716.

The first and second major surfaces of panel 710 are joined by a first edge (i.e., a top edge) and a second edge (i.e., a bottom edge), each having an acute angle (e.g., acute angle 719). The first major surface of first panel 710 has a first angled slot 717 near the second edge of panel 710. Second major surface of panel 710 has a second angled slot 718 near the first edge of panel 710. The top edge of panel 710 is sized and dimensioned to engage the lower angled slot on an adjacent panel, whereas the bottom edge is sized and dimensioned to engage the upper angled slot on an adjacent panel.

Figure 7B:
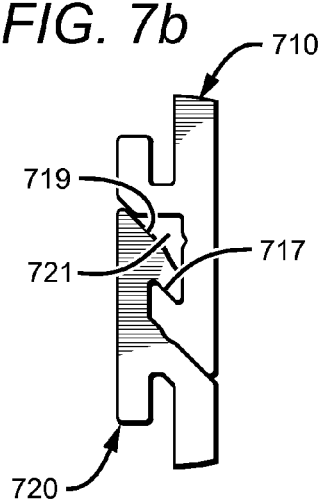
FIG. 7b is a close-up side view of a first panel engaged with a second panel.

FIG. 7b shows a close-up side view of the engagement of the lower edge of first panel 710 with the upper edge of second panel 720. When the two edges are engaged, there is a hollow channel 721 disposed therebetween due to the angle of angled edge 719 and the shape of first angled slot 717.

Figure 7C:
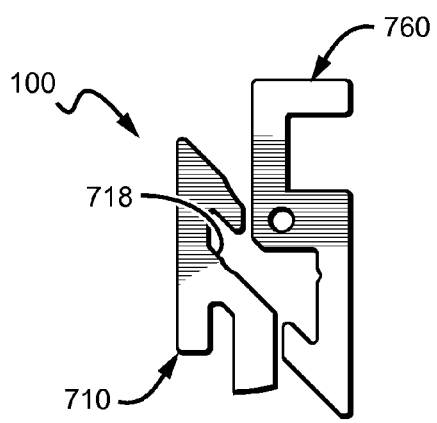
FIG. 7c is a close-up side view of a first panel disengaged with a second panel.

FIG. 7c shows a close-up side view of first panel 710 disengaged with trim panel 760. Engagement is achieved by overlapping the edge of panel 710 with the edge of panel 760, and pushing panel 710 forward and downward. Panel 710 can remain substantially parallel with panel 760 during the engagement. The angled configurations of the slots and edges on the panels eliminates the need to tilt the panels to achieve an engagement.

Figure 8:
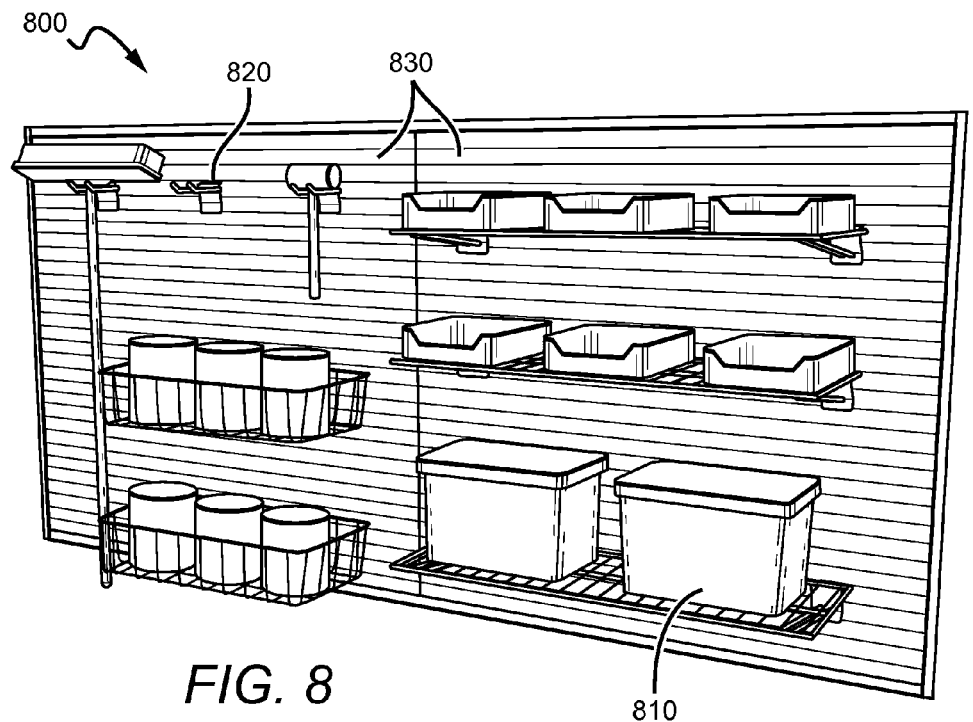
FIG. 8 is a perspective view of a wall mounting assembly being used to store items.

FIG. 8 is a perspective view of a wall mounting assembly 800 being used to store items, such as container 810. Assembly 800 includes a plurality of panels and brackets (e.g., bracket 820 and panels 830).

Figure 9:
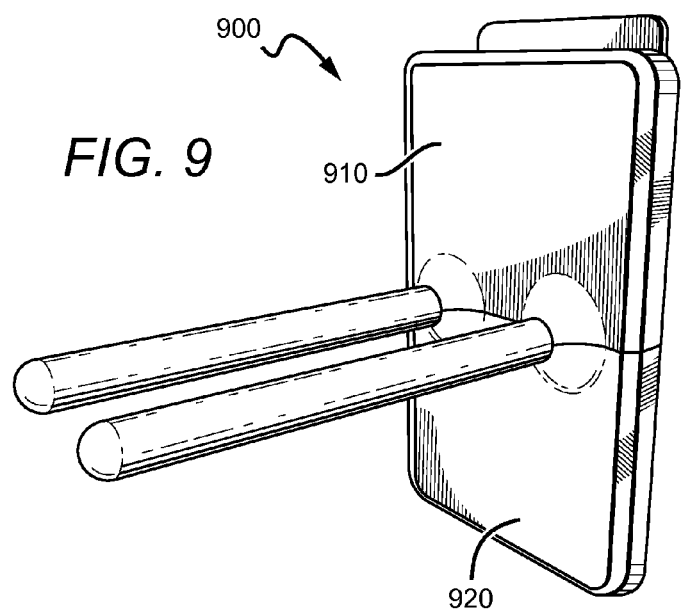
FIG. 9 is a perspective view of a bracket and two bracket covers.

FIG. 9 shows a perspective view of a bracket 900 and two bracket covers 910 and 920. Covers 910 and 920 can be sized, dimensioned, colored, and otherwise configured to resemble the back of a smart phone or some other consumer product.

Figures 10, 11:
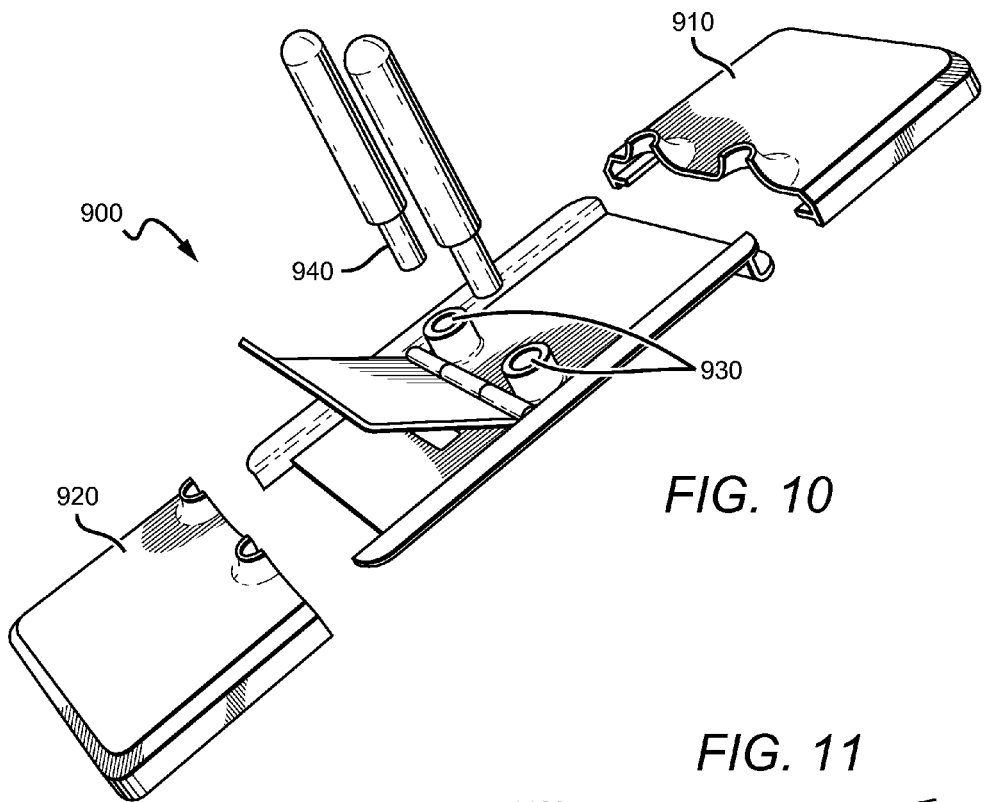
FIG. 10 is an exploded view of the bracket and bracket covers of FIG. 9.
FIG. 11 is a perspective view of a bracket with a rotatable hook.

FIG. 10 shows an exploded view of bracket 900. Covers 910 and 920 removably couple with bracket 900 by slidably engaging the edges of bracket 900. Bracket 900 has two holes 930 for removably receiving elongated member 940. Holes 930 can have threads, snap-fitting protrusions, or some other means for removably securing elongated member 940 in place. In this manner, bracket 900 can be exchangeably used with different configurations of elongated members, hangers, shelving, and the like.

FIG. 11 shows a perspective view of a bracket 1100 that has a rotatable hook 1110. Hook 1110 can rotate outward as shown by arrow 1120.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A bracket for a wall mounting assembly having a first and second recess, comprising:
    a first frame member having an opening and a first hook that is sized and dimensioned to engage the first recess;
    a second frame member having a second hook disposed through the opening of the first frame member, wherein the second hook is sized and dimensioned to engage the second recess;
    wherein the first hook is a downward facing L-shaped hook and the second hook is an upward facing L-shaped hook;
    wherein the first frame member and second frame member are rotatably coupled at a hinge such that the second frame member is capable of moving between a first position and a second position; and
    wherein the second hook engages the second recess when the second frame member is in the first position and the second hook disengages the second recess when the second frame member is in the second position.

2. The bracket of claim 1, wherein the second frame member further comprises a handle portion angled with the second hook.

3. The bracket of claim 1, further comprising an elongated member coupled with and extending from the first frame member for hanging an object.

4. The bracket of claim 3, wherein the elongated member is removably coupled with the first frame member via a snap fitting.

5. The bracket of claim 1, further comprising a first cover and a second cover sized and dimensioned to cover a front side of the first and second frame members.

6. The bracket of claim 5, wherein the first and second covers slidably engage a first edge and a second edge of the first frame member.

7. The bracket of claim 1, wherein the first and second hooks are disposed on a back side of the first member and further comprising a third hook rotatably coupled with the first frame member and disposed on a front side of the first frame member.

* * * * *